(12) United States Patent
Yi et al.

(10) Patent No.: US 12,402,051 B1
(45) Date of Patent: Aug. 26, 2025

(54) SYSTEMS AND METHODS FOR MAINTAINING DATA SESSION CONTINUITY

(71) Applicant: Cable Television Laboratories, Inc., Louisville, CO (US)

(72) Inventors: Yunjung Yi, Vienna, VA (US); Sundar R. Sriram, Aurora, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 241 days.

(21) Appl. No.: 18/056,215

(22) Filed: Nov. 16, 2022

Related U.S. Application Data (60) Provisional application No. 63/279,733, filed on Nov. 16, 2021.

(51) Int. Cl.
*H04W 36/14* (2009.01)
*H04W 12/065* (2021.01)
*H04W 36/00* (2009.01)
*H04W 76/15* (2018.01)

(52) U.S. Cl.
CPC ......... *H04W 36/14* (2013.01); *H04W 12/065* (2021.01); *H04W 36/0011* (2013.01); *H04W 76/15* (2018.02)

(58) Field of Classification Search
CPC ... H04W 36/14; H04W 76/15; H04W 12/065; H04W 36/0011
USPC ....... 370/331, 328, 329, 338, 341, 345, 350; 455/436, 442
See application file for complete search history.

(56) References Cited

U.S. PATENT DOCUMENTS

| | | | |
|---|---|---|---|
| 2005/0265284 A1* | 12/2005 | Hsu | H04W 36/1446 370/331 |
| 2011/0268435 A1* | 11/2011 | Mizutani | H04Q 11/0067 398/5 |

* cited by examiner

*Primary Examiner* — Nghi H Ly
(74) *Attorney, Agent, or Firm* — PdZ Patent Law, PLLC (57) ABSTRACT

A method for maintaining data session continuity includes (1) receiving, at a controller, information on a first data session for a user equipment (UE) device, the first data session being supported by a first communication network, and the UE device being authenticated with each of the first communication network and a second communication network; (2) determining, at the controller, that the first data session should be switched from the first communication network to the second communication network; and (3) in response to determining that the first data session should be switched from the first communication network to the second communication network, sending a request to the UE device to switch the first data session to the second communication network.

17 Claims, 8 Drawing Sheets

SYSTEMS AND METHODS FOR MAINTAINING DATA SESSION CONTINUITY

CROSS REFERENCE TO RELATED APPLICATIONS

This application claims the benefit of priority to U.S. Provisional Patent Application No. 63/279,733, filed on Nov. 16, 2021, which is incorporated herein by reference.

BACKGROUND

Wireless communication devices are increasingly capable of being authenticated on multiple wireless communication networks. For example, a dual subscriber identity module (SIM) mobile phone may be authenticated on a respective wireless communication network for each SIM.

DETAILED DESCRIPTION OF THE EMBODIMENTS

A wireless communication device supporting multiple wireless communication networks may switch between the wireless communication networks. For example, a wireless communication device may be configured to connect to a first wireless communication network, and the wireless communication device may switch to a second wireless communication network when the first wireless communication network becomes unavailable, congested, or unreliable. It is desirable that the wireless communication device maintain any active data sessions without interruption while switching between wireless communication networks.

Data session continuity is conventionally maintained during switching between wireless communication networks through tight coordination between the wireless communication networks. For example, conventional Access Traffic Steering, Switching, and Splitting (ATSSS) may be employed at one of the wireless communication networks, and conventional ATSSS may identify one or more wireless communication networks which are best suited for serving a wireless communication device. Conventional ATSSS may then steer, switch, and/or split data traffic among the identified wireless communication networks. Conventional ATSSS may offer fast adaptation of a wireless communication network based on availability of the wireless communication network. However, conventional ATSSS may require tight coordination of the wireless communication networks, and conventional ATSSS must be anchored in one of the wireless communication networks. For example, conventional ATSSS may require exchange of registration information for a wireless communication device between wireless communication networks. As another example, in the case where one of the wireless communication networks is a Third Generation Partnership Project (3GPP) wireless communication network, conventional ATSSS may require that a session management function (SMF) of an anchor wireless communication network maintain control over a multi-access protocol data unit (PDU) session across two wireless communication networks. As such, conventional ATSSS may require interfaces between wireless communication networks, e.g., control domain interfaces and/or data domain interfaces, to support required coordination between the wireless communication networks.

A conventional session and service continuity (SSC) function may also be used to enable release of an existing PDU session supported by one wireless communication network while establishing a new PDU session via another wireless communication network. For example, a conventional SSC may provide continuity while changing a user plane function (UPF) and/or a wireless communication network supporting a current PDU session. A conventional SSC, however, must be anchored on a single wireless communication network, and there must be tight coordination between the wireless communication networks, to support communication session continuity across multiple wireless communication networks. As such, a conventional SSC has similar drawbacks to conventional ATSSS.

Disclosed herein are systems and methods for maintaining data session continuity across multiple communication networks that at least partially overcome the above-discussed drawbacks of conventional approaches. Particular embodiments of the new systems and methods advantageously do not require tight coordination between communication networks to maintain data session continuity when a communication device, e.g., a user equipment device, switches between communication networks. Additionally, some embodiments are implemented independently of the communication networks, i.e., they do not need to be anchored in a communication network. As such, certain embodiments may be implemented with existing communication networks without requiring changes to the communication networks. Furthermore, particular embodiments are capable of operating with different types of communication networks.

The new systems and methods are discussed below with respect to wireless communication networks. It is understood, however, that the new systems and methods could also be applied to wireline communication networks, including, but not limited to, optical wireline communication networks (e.g., Ethernet passive optical network (EPON) communication networks, radio frequency of over glass (RFOG or RFoG) communication networks, Gigabit-capable passive optical network (GPON) communication networks, and coherent passive optical network (CPON) communication networks, including point-to-point, point-to-multipoint, cascaded, etc., and any variations, improvements, and/or evolutions thereof), cable communication networks (e.g., data over cable service interface specification (DOCSIS) communication networks) and digital subscriber line (DSL) communication networks.

Figure 1:
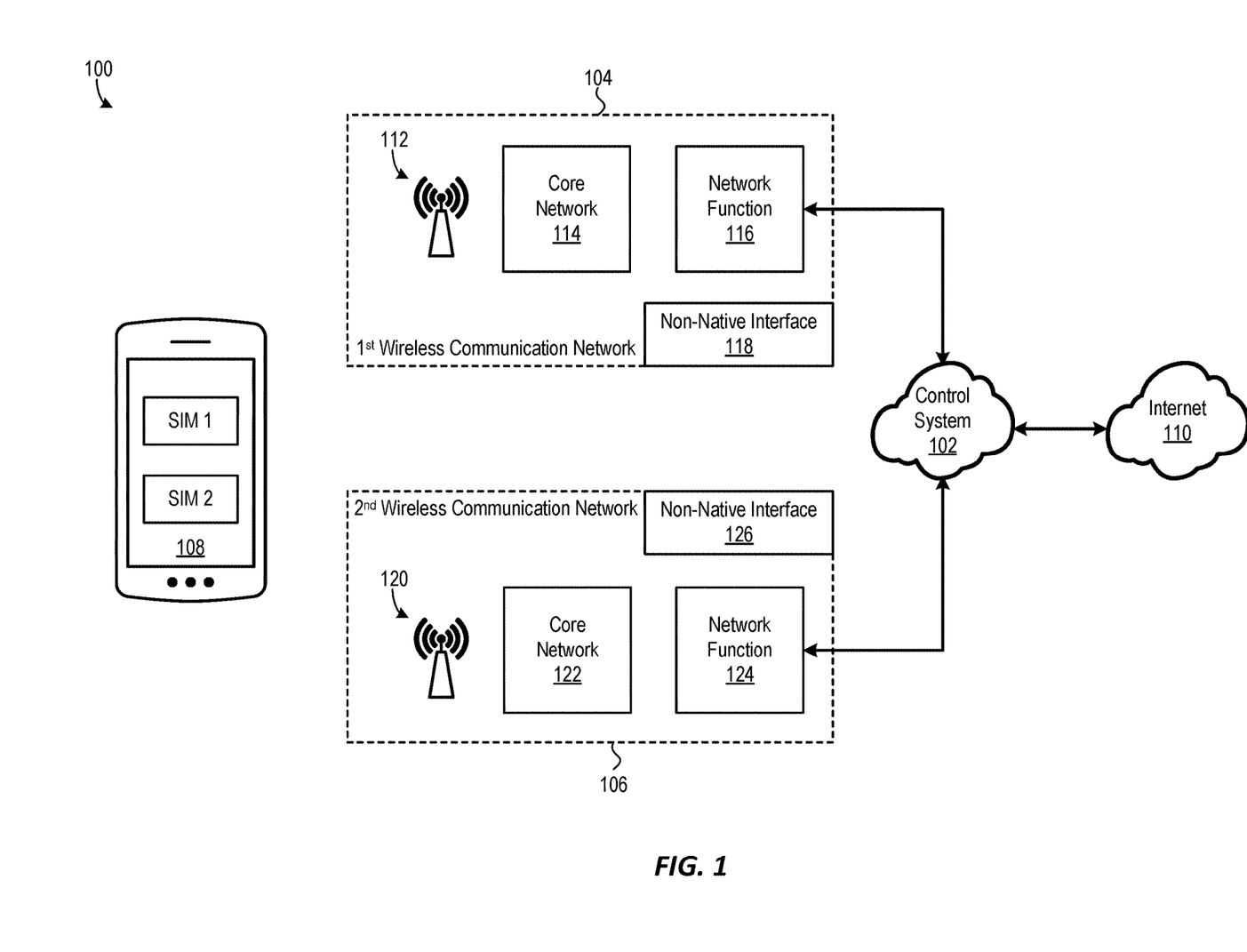
FIG. 1 is a block diagram of a communication environment including a system for maintaining data session continuity, according to embodiment.

FIG. 1 is a block diagram of a communication environment 100, which includes a control system 102, which is one embodiment of the new systems for maintaining data session continuity. Communication environment 100 further includes a first wireless communication network 104, a second wireless communication network 106, a user equipment (UE) device 108, and the Internet 110. Communication environment 100 could include additional elements, e.g., one or more additional wireless communication networks, one or more additional UE devices, etc., without departing from the scope hereof.

UE device 108 includes two credentials in the form of a first subscriber identity module (SIM 1) and a second subscriber identity module (SIM 2). SIM 1 is used to authenticate UE device 108 with first wireless communication network 104, and SIM 2 is used to authenticate UE device 108 with second wireless communication network 106. Each of SIM 1 and SIM 2 is, for example, a physical SIM or an electronic SIM. One or more of SIM 1 and SIM 2 could be replaced with, or supplemented by, one or more alternative credentials or identifiers, such as a user identifier and a password, an encryption key, a serial number, a media access control (MAC) address, etc. Additionally, UE device 108 could be modified to include one or more additional SIMs or other types of credentials, such as to enable UE device 108 to authenticate with three or more wireless communication networks.

In certain embodiments, SIM 1 and SIM2 may share capabilities, resources, etc. For example, UE device 108 may have a single phone number associated with each of SIM 1 and SIM 2. Each of SIM 1 and SIM 2 may support one or more data sessions, such as PDU sessions. For example, in some embodiments, UE device 108 may receive content, such as video content, music content, etc., via either SIM 1 or SIM 2. As another example, a voice over Internet protocol (VoIP) application of UE device 108 may communicate with the Internet 110 via SIM 1 and first wireless communication network 104, and an IoT application of UE device 108 may communicate with the Internet 110 via SIM 2 and second wireless communication network 106. Additionally, in particular embodiments, SIM 1 and the SIM 2 may share one or more applications of UE device 108, and UE device 108 may communicate with the Internet 110 via SIM 1 and/or the SIM 2.

While UE device 108 is depicted as being a mobile telephone, UE device 108 could be another type of UE device. For example, in some embodiments, UE device 108 is one or more of a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an integrated access and backhaul (IAB) access point, a microcell, a picocell, a femtocell, a macrocell, a Wi-Fi-based application, a satellite communication device, etc). UE device 108 could also be replaced with a different type of wireless communication device without departing from the scope hereof.

The Internet 110 includes, for example, the public Internet and/or a private intranet. Additionally, Internet 110 could be replaced with, or supplemented by, one or more other public and/or private networks. Internet 110 can also include content sources (e.g., file servers), communication applications, etc.

Each of first wireless communication network 104 and second wireless communication network 106 is configured to provide UE devices, e.g., UE device 108, access to the Internet 110 and/or other resources (not shown), such as voice calling. In some embodiments, first wireless communication network 104 and second wireless communication network 106 are independent wireless communication networks. Accordingly, in some embodiments, UE device 108 is independently authenticated with each of first wireless communication network 104 and second wireless communication network 106 via SIM 1 and SIM 2, respectively. Additionally, in particular embodiments, there is minimal coordination, or no coordination, between first wireless communication network 104 and second wireless communication network 106, when maintaining data session continuity.

First wireless communication network 104 includes a radio access network 112, a core network 114, a network function 116, and an optional non-native interface 118. Radio access network 112 includes one or more wireless base stations, or analogous devices, configured to wirelessly communicate with UE devices, such as UE device 108. In embodiments where first wireless communication network 104 is a 3GPP wireless communication network, radio access network 112 includes, for example, one or more an eNB, a gNB, an IAB access point, or successors thereof. However, radio access network 112 could be a non-3GPP radio access network, such as a Wi-Fi radio access network, a satellite radio access network (e.g., using very low earth orbit (VLEO) satellites, low earth orbit (LEO) satellites, medium earth orbit (MEO) satellites, or geostationary equatorial orbit (GEO) satellites), a long range (LoRa) wireless communication network, a Zigbee wireless communication network, a Z-Wave wireless communication network, etc.

Core network 114 controls first wireless communication network 104. In embodiments where first wireless communication network 104 is a 3GPP wireless communication network, core network 114 includes, for example, an evolved packet core (EPC), a fifth-generation (5G) core network, a sixth-generation (6G) core network, or successors thereof. However, core network 114 could be non-3GPP core network, such as Wi-Fi network controller, a satellite core network, etc. Network function 116 is configured, for example, to provide steering, switching, and/or splitting of data traffic between first wireless communication network 104 and UE devices connected thereto. In embodiments where first wireless communication network 104 is a 3GPP wireless communication network, network function 116 may include a packet gateway (PGW) and user plane function (UPF).

Optional non-native interface 118 provides an interface to first wireless communication network 104 using a protocol other than a protocol of radio access network 112. For example, if radio access network 112 is a 3GPP radio access network, non-native interface 118 could be an interface to first wireless communication network 104 using a non-3GPP protocol, such as a Wi-Fi protocol, a satellite protocol, a wireline protocol, etc. In some embodiments where wireless communication network 104 is a 3GPP wireless communication network, non-native interface 118 includes, for example, a non-3GPP inter-working function (N3IWF) and/or a trusted non-3GPP gateway function (TNGF).

Second wireless communication network 106 includes a radio access network 120, a core network 122, a network function 124, and an optional non-native interface 126, which are analogous to radio access network 112, core network 114, network function 116, and non-native interface 118. However, first wireless communication network 104 and second wireless communication network 106 need not have the same configuration. For example, in some embodiments, first wireless communication network 104 is a 3GPP wireless communication network and second wireless communication network 106 is a non-3GPP wireless communication network. As another example, in some embodiments, first wireless communication network 104 and second wireless communication network 106 are different types of 3GPP wireless communication networks. Examples of 3GPP wireless communication networks include, but are not limited, long term evolution (LTE) wireless communication networks, 5G wireless communication networks, and 6G wireless communication networks. Additionally, in particular embodiments, first wireless communication network 104 and second wireless communication network 106 are operated by different respective parties. Furthermore, in some embodiments, non-native interface 118 of first wireless communication network 104 and non-native interface 126 of second wireless communication network 106 are collectively implemented by a single interface shared by the two wireless communication networks, such as a single shared N3IWF interface or a single shared TNGF interface.

Control system 102 is configured to control handover of data sessions of UE devices, e.g., data sessions of UE device 108, between first wireless communication network 104 and second wireless communication network 106. For example, in particular embodiments, control system 102 is configured to determine which wireless communication network should support a given data session for UE device 108, e.g., a PDU session for UE device 108, such as based on one or more wireless communication link quality, wireless communication network congestion, UE device mobility 108, etc. Such determination performed by control system 102 may referred to as adaptive routing control (ARC), session service continuity (SSC), or user equipment route selection policy (URSP). While control system 102 is in communication with each of first wireless communication network 104 and second wireless communication network 106, control system 102 is separate from each of the two wireless communication networks. As such, control system 102 may be considered an "over the top" control system. Additionally, in particular embodiments, control system 102 is configured to control handover of UE devices, e.g., UE device 108, between first wireless communication network 104 and second wireless communication network 106 without requiring coordination between the wireless communication networks. In some alternate embodiments, though, controller 102 is incorporated in one of first wireless communication network 104 or second wireless communication network 106.

In some embodiments, control system 102 is a discrete element, such as formed from digital and/or analog electronics. In certain embodiments, control system 102 is at least partially embodied by one or more processors executing instructions in the form of software and/or firmware. In particular embodiments, controls system 102 is implemented by a distributed computing system, such as a cloud computing system. Control system 102 could be at least partially implemented in the Internet 110.

Communication environment 100 is henceforth discussed as if both of first wireless communication network 104 and second wireless communication network 106 are 3GPP wireless communication networks. It is understood, though, that one or both of first wireless communication network 104 and second wireless communication network 106 could instead be a non-3PP wireless communication network.

Figure 2:
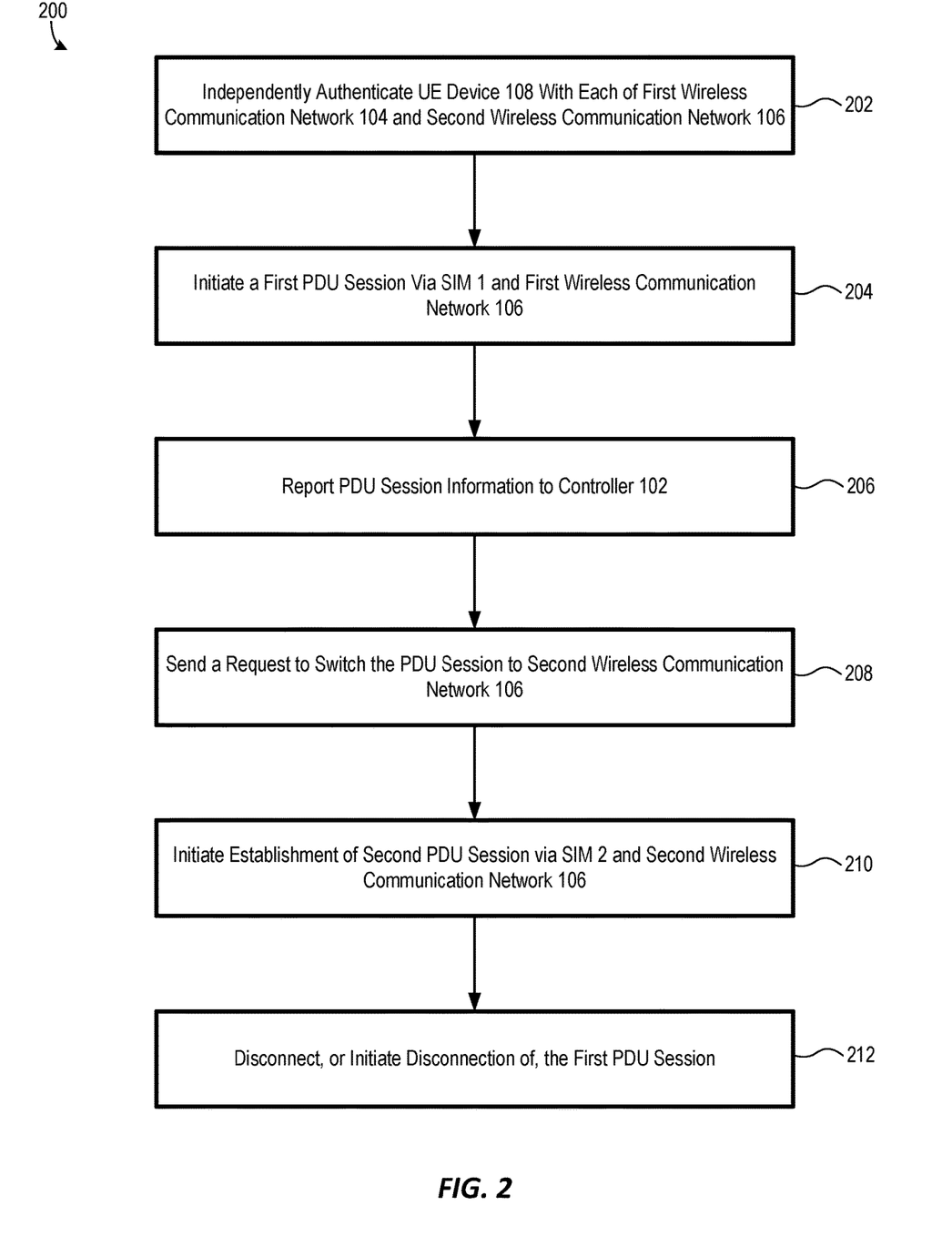
FIG. 2 is a flow chart of a method for maintaining data session continuity, according to embodiment.

FIG. 2 is flow chart of a method 200 for maintaining data session continuity, which is one example of operation of communication environment 100. It is understood, though, that communication environment 100 is not limited to operating according to method 200.

Figure 3:
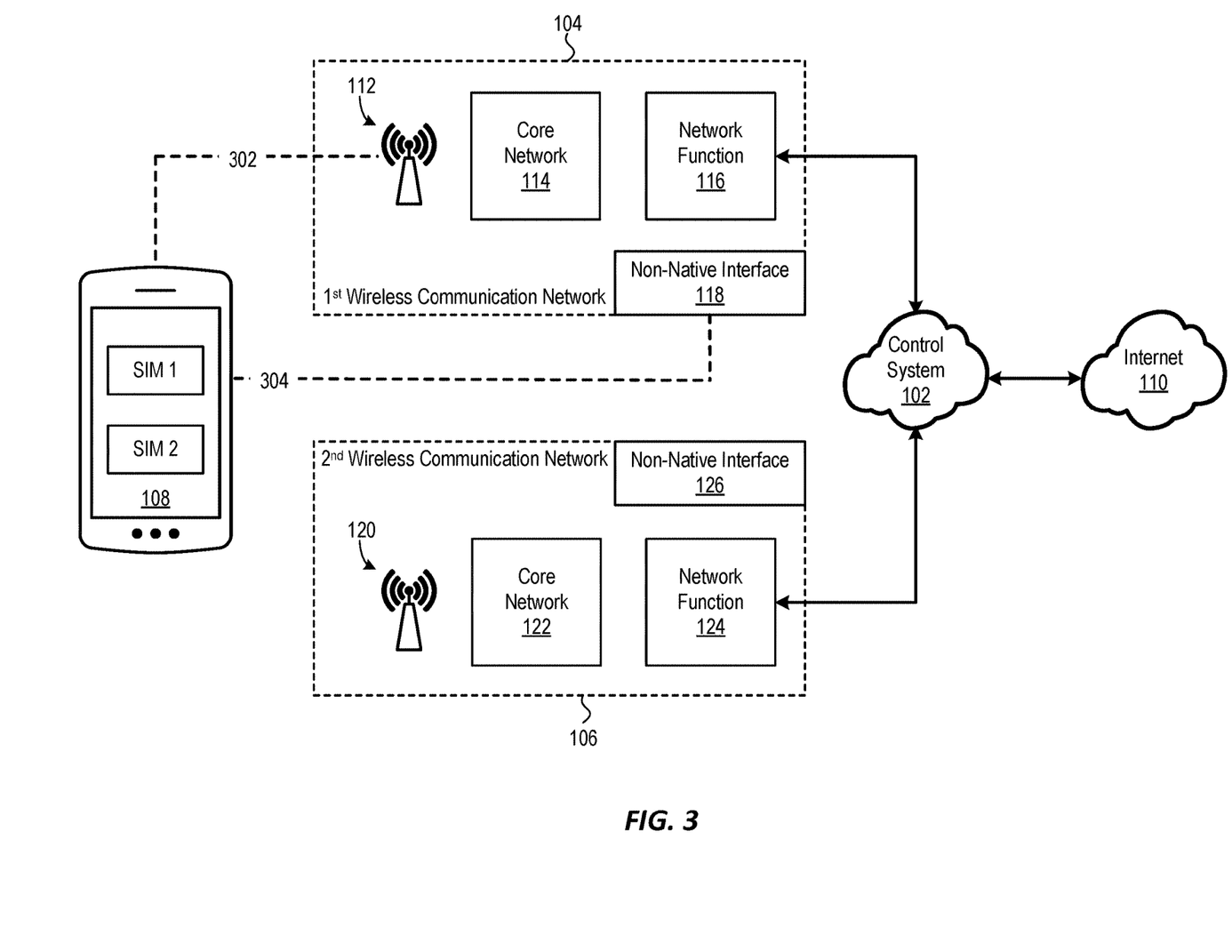
FIG. 3 illustrates an example of a data session supported by a first wireless communication network of the FIG. 1 wireless communication environment.

In a block 202 of method 200, UE device 108 is independently authenticated with each of first wireless communication network 104 and second wireless communication network 106 via SIM 1 and SIM 2, respectively. In a block 204 of method 200, UE device 108 establishes a first PDU session with first wireless communication network 104 via a 3GPP wireless communication link 302 and/or a non-3GPP wireless communication link 304 (e.g., Wi-Fi or satellite), as illustrated in FIG. 3. In one embodiment of block 204, UE device 108 initiates the first PDU session at least partially according to the 3GPP 4.3 session management procedure. UE device 108 could be configured to prioritize first wireless communication network 104 for data PDU sessions and second wireless communication network 106 for voice calls, such that UE device 108 connects to first wireless communication network 104 to support a data session whenever first wireless communication network 104 is available.

In a block 206 of method 200, UE device 108 reports information on the first PDU session to controller 102. The reported information includes, for example, identification of the first PDU session, identification of the wireless communication network supporting the first PDU session, identification of one or more wireless communication links supporting the first PDU session, quality of first wireless communication network 104, quality of experience of the first PDU session as supported by first wireless communication network 104, etc. Controller 102 subsequently determines that the first PDU session for UE device 108 should be switched from first wireless communication network 104 to second wireless communication network 106 at least partially based on the information reported by UE device 108. For example, controller 102 may determine that the first PDU session for UE device 108 should be switched from first wireless communication network 104 to second wireless communication network 106 in response to one or more of quality of wireless communication links 302 and/or 304 falling below a threshold value, quality of first wireless communication network 104 falling below a threshold value, quality of experience of the first PDU session falling below a threshold value, congestion of first wireless communication network 104 rising above a threshold value, congestion of second wireless communication network 106 falling below a threshold value, etc.

Figure 4:
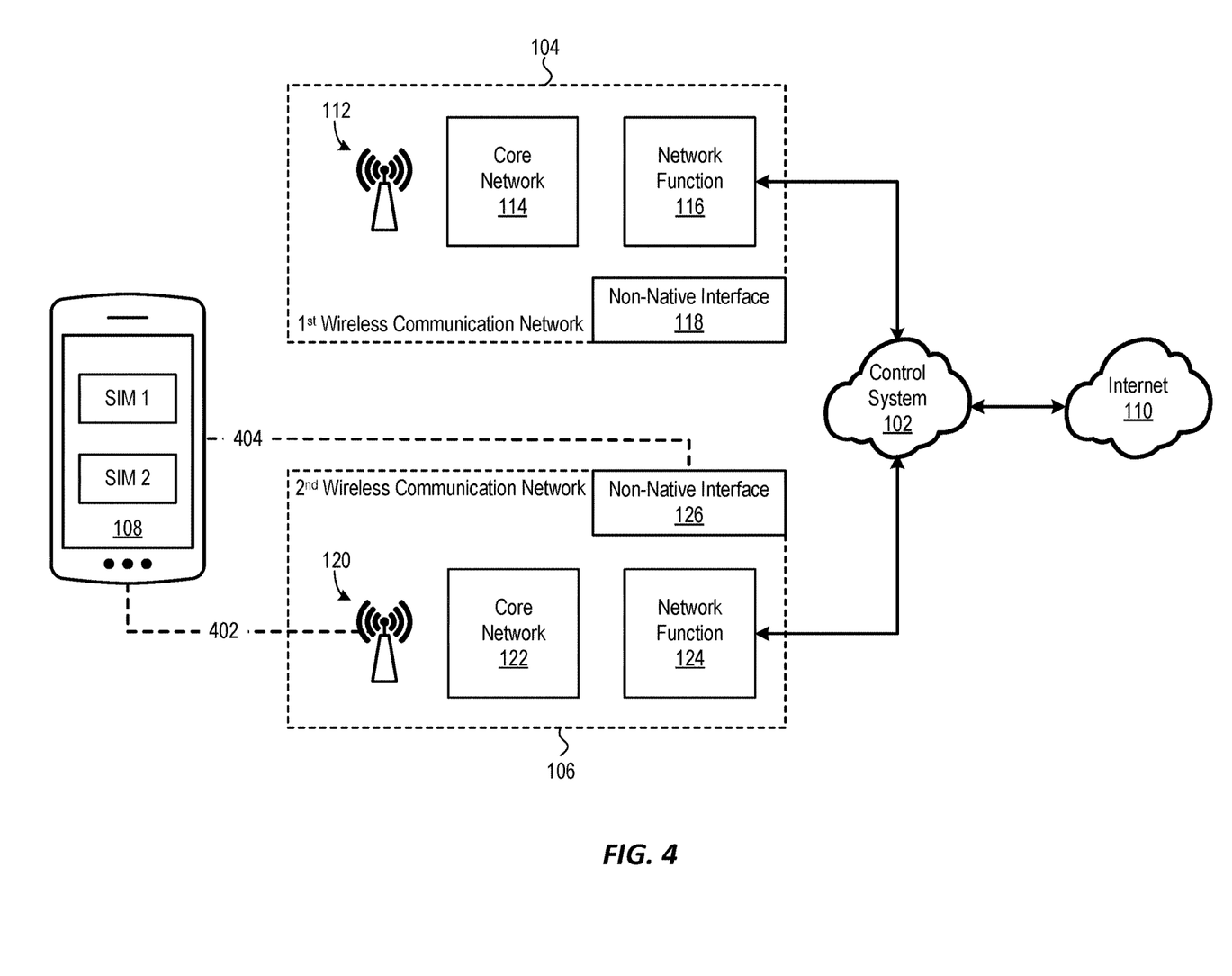
FIG. 4 illustrates an example of a data session supported by a second wireless communication network of the FIG. 1 wireless communication environment.

In response to controller 102 determining that the PDU session for UE device 108 should be switched from first wireless communication network 104 to second wireless communication network 106, controller 102 sends to UE device 108 and/or second wireless communication network 106 a request to switch the first PDU session to second wireless communication network 106, in a block 208 of method 200. In some embodiments, the request includes an identification of the first PDU session. In a block 210 of method 200, UE device 108 initiates establishment of a second PDU session via SIM 2 and second wireless communication network 106 in response to receiving the request. The second PDU session replaces the first PDU session, and the second PDU session is supported by second wireless communication network 106, as illustrated in FIG. 4 where the second PDU session is supported by a 3GPP wireless communication link 402 and/or a non-3GPP wireless communication link 404 (e.g., Wi-Fi or satellite). UE device 108 may use the same PDU session information when establishing the second PDU session that was used when establishing the first PDU session. Second wireless communication network 106 may subsequently update second PDU session information. Switching of a PDU session of UE device 108 from second wireless communication network 106 to first wireless communication network 104 may proceed in a manner analogous to that of example 200. In a block 212 of method 200, first wireless communication network 104 disconnects the first PDU session, or UE device 108 initiates disconnection of the first PDU session.

Referring again to block 210, the second PDU session may be initiated, for example, according to one of the following options:

Option 1: use non-roaming and roaming with local breakout.

Option 2: extend switching of the PDU session between non-3GPP access and 3GPP access. With option 2, UE device 108 may register with second wireless communication network 106 if UE device 108 is not already registered. Additionally, UE device 108 may perform a session establishment procedure based 3GPP standard 4.3.2.2 (e.g., 4.3.2.2.1) in the background. UE device 108 may disconnect the UE session from first wireless communication network 104, and first wireless communication network 104 may release any resources assigned to the first PDU session.

Option 3: use a home-routed roaming architecture.

Figure 5:
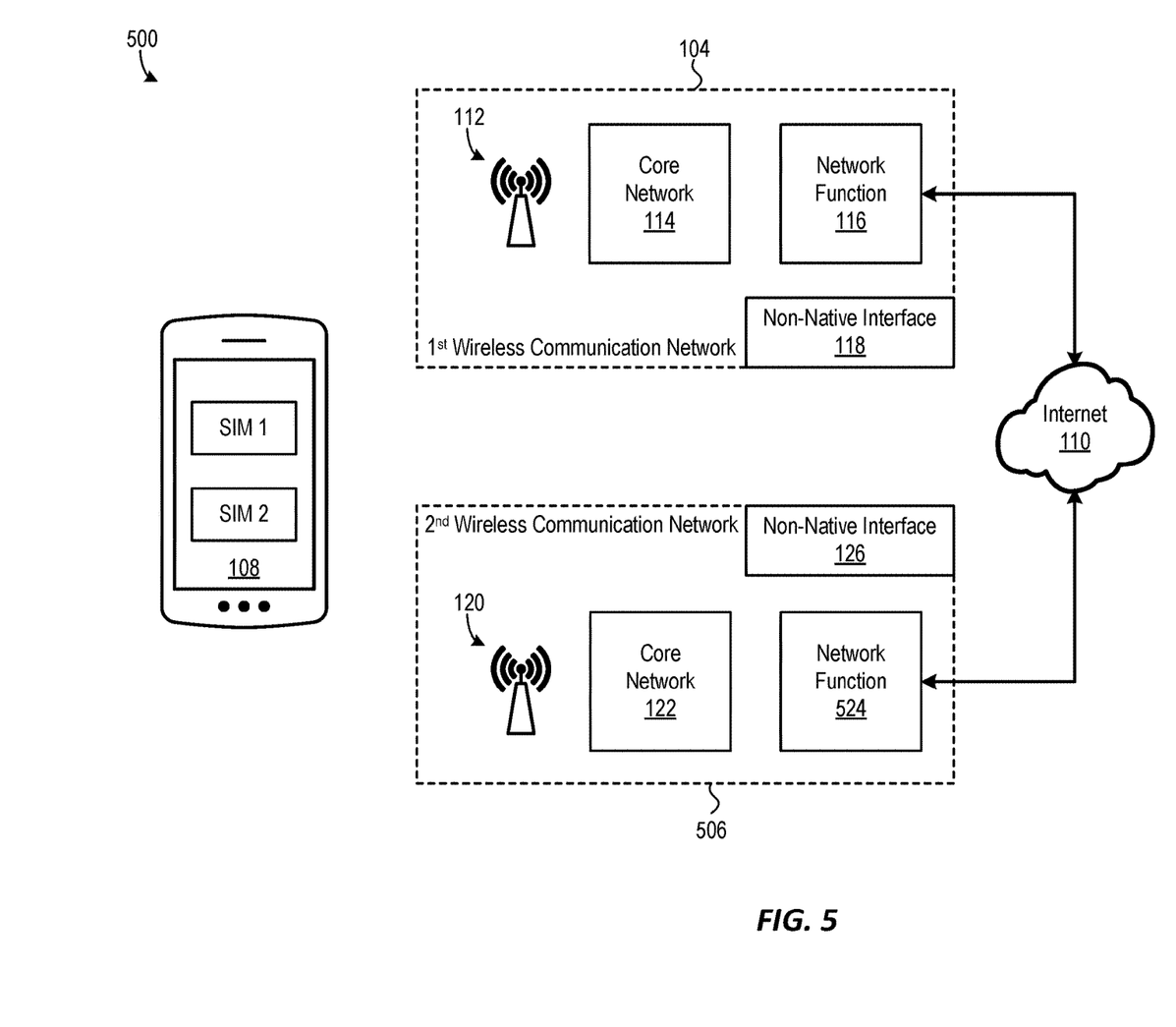
FIG. 5 is a block diagram of an alternate embodiment of the FIG. 1 communication network.

FIG. 5 is a block diagram of a communication environment 500, which is an alternate embodiment of communication environment 100 of FIG. 1. Second wireless communication network 106 in communication environment 100 is replaced with a second wireless communication network 506 in communication environment 500. Second wireless communication network 506 is like second wireless communication network 106 except that network function 124 is replaced with a network function 524 which further includes capabilities similar to those of controller 102. For example, in some embodiments, network function 524 implements one or more of ARC, SSC, and URSP. Consequently, controller 102 is omitted in communication environment 500.

Figure 6:
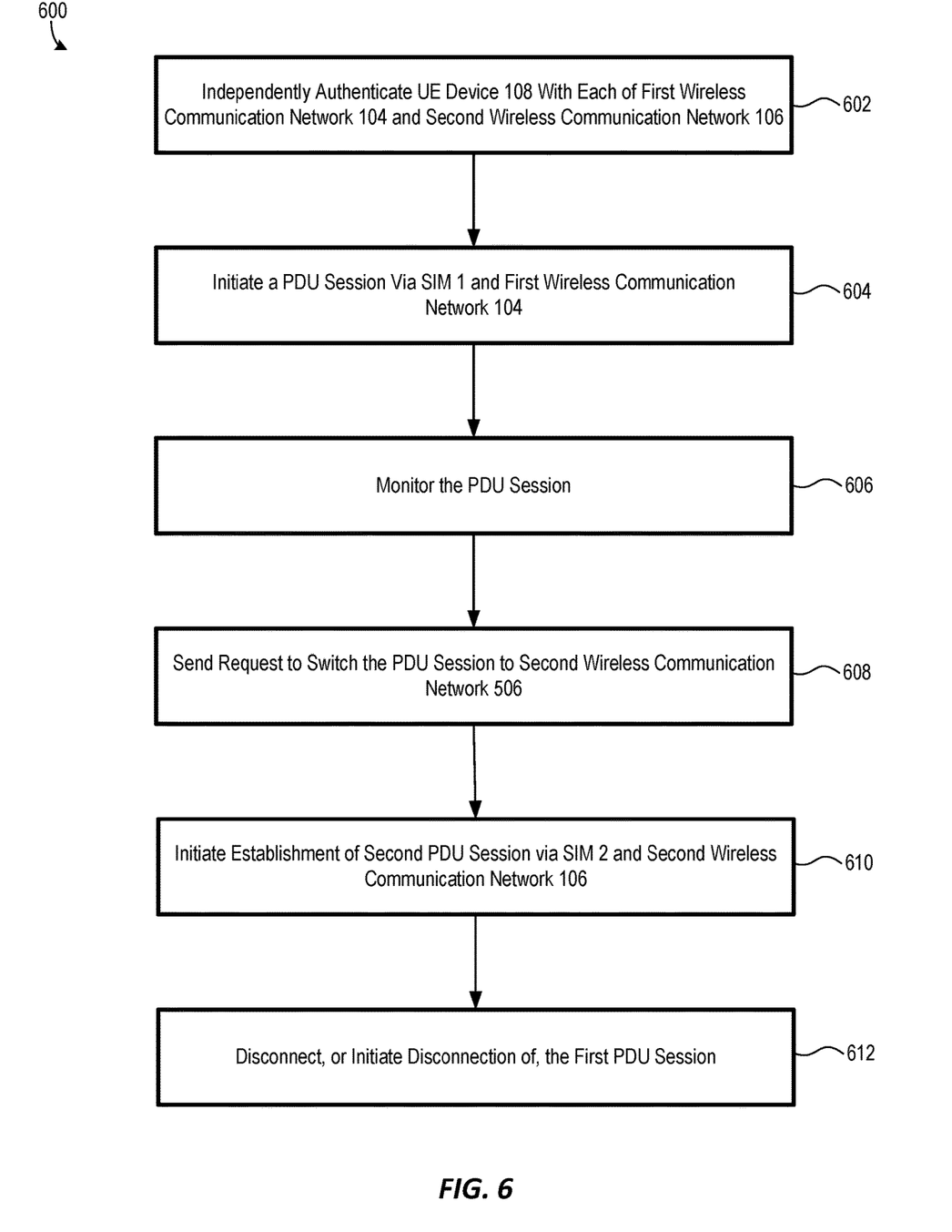
FIG. 6 is a flow chart of another method for maintaining data session continuity, according to embodiment.

FIG. 6 is flow chart of a method 600 for maintaining data session continuity, which is one example of operation of communication environment 500. It is understood, though, that communication environment 500 is not limited to operating according to method 600.

Figure 7:
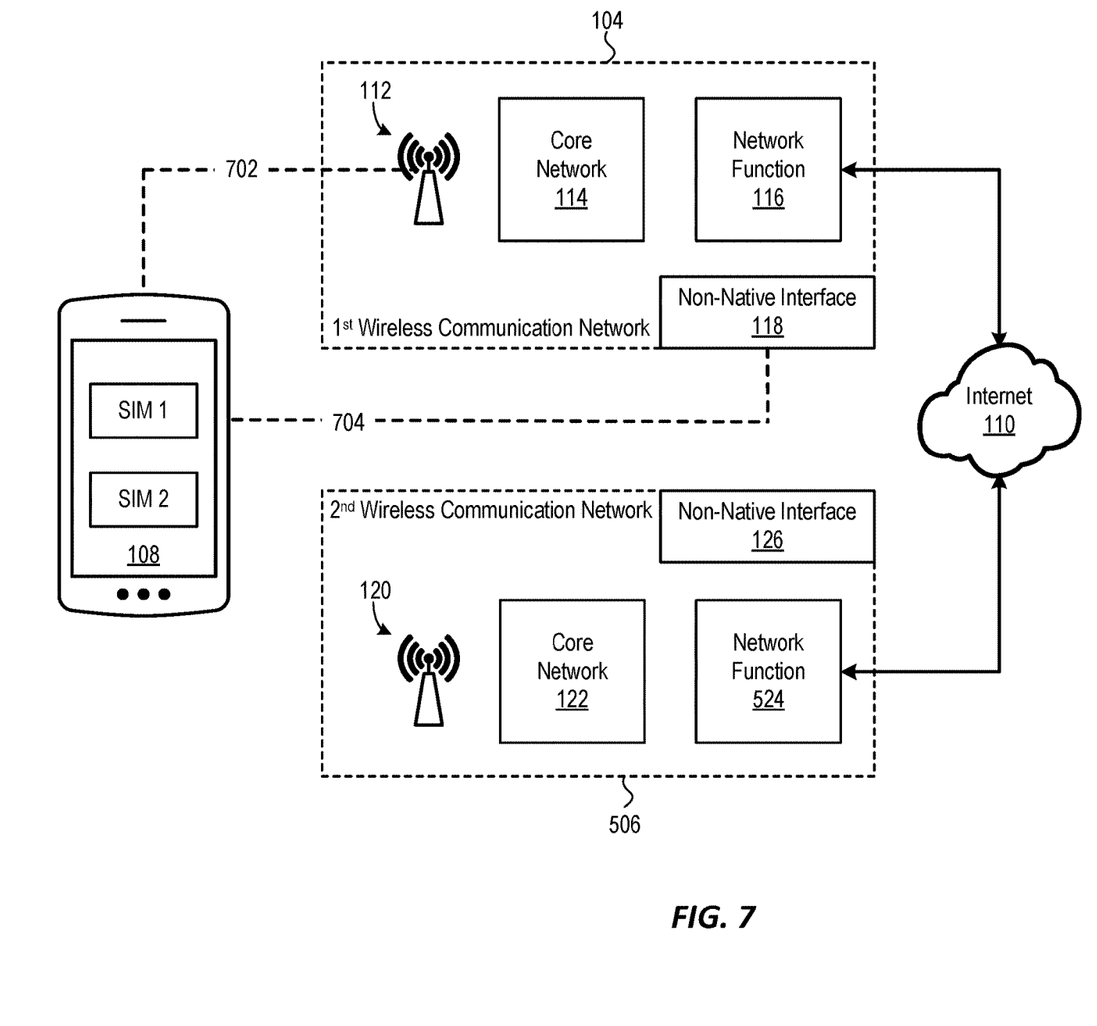
FIG. 7 illustrates an example of a data session supported by a first wireless communication network of the FIG. 5 wireless communication environment.

In a block 602 of method 600, UE device 108 is independently authenticated with each of first wireless communication network 104 and second wireless communication network 506 via SIM 1 and SIM 2, respectively. In a block 604 of method 600, UE device 108 establishes a first PDU session with first wireless communication network 104 via a 3GPP wireless communication link 702 and/or a non-3GPP wireless communication link 704 (e.g., Wi-Fi or satellite), as illustrated in FIG. 7. For example, in embodiments where non-native interface 118 includes a N3IWF interface, non-3GPP wireless communication link 704 may include an IPSec channel. As another example, in embodiments where non-native interface 118 includes a TNGF interface, non-3GPP wireless communication link 704 may include an IP flow.

In a block 606 of method 600, second wireless communication network 506, e.g., network function 524 of second wireless communication network 506, monitors the first PDU session supported by first wireless communication network 104. For example, second wireless communication network 506 may monitor characteristics of one or more communication links of first wireless communication network 104 and/or characteristics of PDU sessions supported by first wireless communication network 104. In some embodiments, second wireless communication network 506 receives information on first wireless communication 104, and/or PDU sessions supported by first wireless communication network 104, from UE device 108. For example, UE device 108 may provide second wireless communication network 506 a list of PDU sessions support by SIM 1 and first wireless communication network 104. As another example, UE device 108 may provide second wireless communication network 506 network information on quality of first wireless communication network 104 (e.g., signal quality of a current serving base station, signal quality of neighbor cells, packet error rate of a PDU session, bit error rate of a PDU session, CSI feedback, and/or the like) for each PDU session established via first wireless communication network 104. In some embodiments, UE device 108 provides second wireless communication network 506 information on first wireless communication network 104 and/or sessions supported by first wireless communication network 104 in response to one or more thresholds being satisfied and/or in response to occurrence of one or more events.

Network function 524 determines that the first PDU session should be switched from first wireless communication network 104 to second wireless communication network 506 at least partially based on some or all of the aforementioned information received from UE device 108. For example, network function 524 may determine that the first PDU session should be switched from first wireless communication network 104 to second wireless communication network 106 in response to one or more of quality of wireless communication links 702 and/or 704 falling below a threshold value, quality of first wireless communication network 104 falling below a threshold value, quality of experience of the first PDU session falling below a threshold value, congestion of first wireless communication network 104 rising above a threshold value, congestion of second wireless communication network 506 falling below a threshold value, etc.

Figure 8:
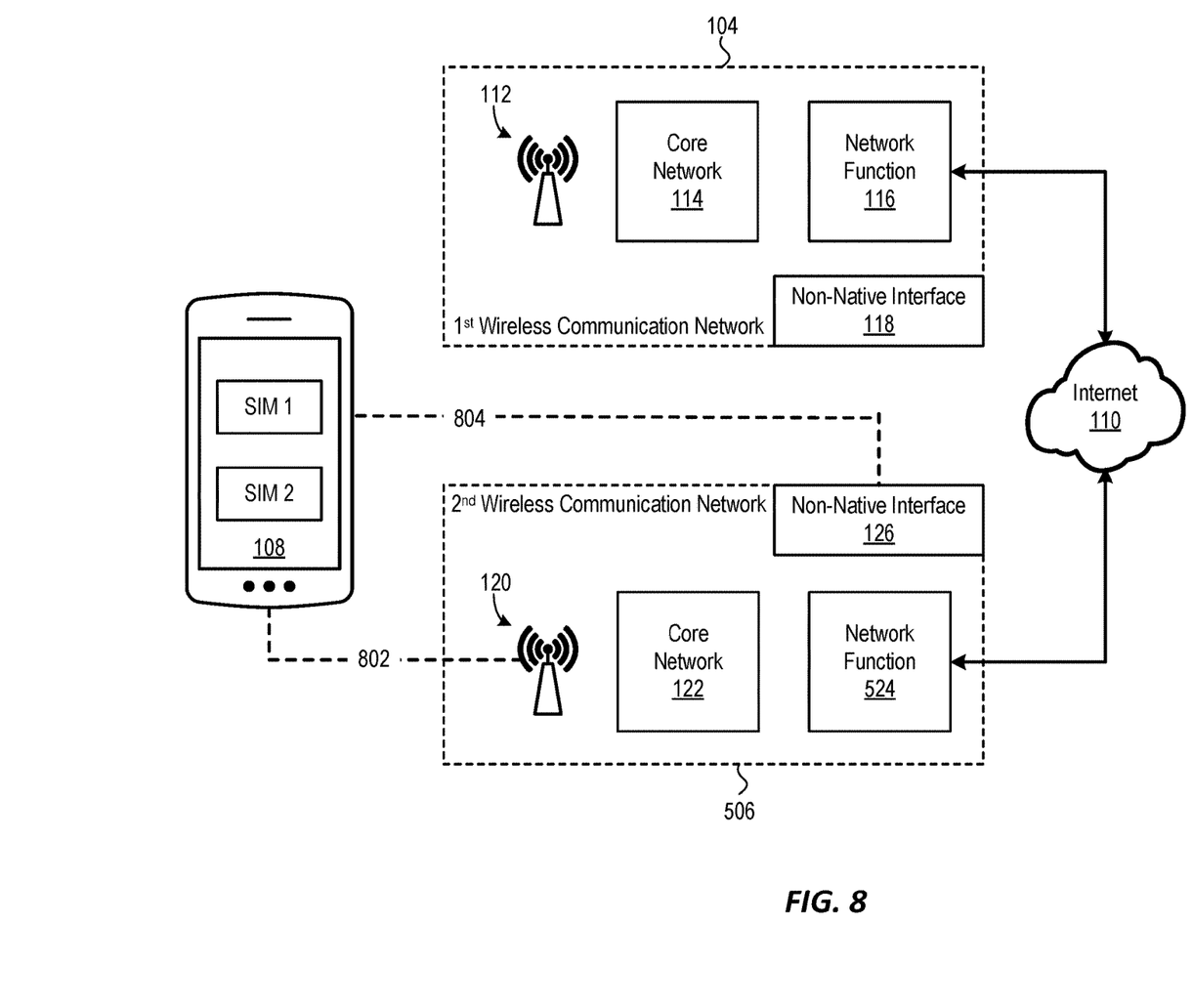
FIG. 8 illustrates an example of a data session supported by a second wireless communication network of the FIG. 5 wireless communication environment.

In response to network function 524 determining that the first PDU session should be switched from first wireless communication network 104 to second wireless communication network 506, network function 524 sends a request to UE device 108 to switch the first PDU session from first wireless communication network 104 to second wireless communication network 506, in a block 608 of method 600. In response thereto, UE device 108 initiates establishment of a second PDU session with second wireless communication network 506 in a block 610 of method 600, where the second PDU session replaces the first PDU session. The second PDU session is supported by second wireless communication network 506, as illustrated in FIG. 8 where the second PDU session is supported by a 3GPP wireless communication link 802 and/or a non-3GPP wireless communication link 804 (e.g., Wi-Fi or satellite). Second wireless communication network 506 may cause a local breakout or home routed roaming session to be established from first wireless communication network 104 to second wireless communication network 506. In a block 612 of method 600, first wireless communication network 104 disconnects the first PDU session, or UE device 108 initiates disconnection of the first PDU session.

Referring again to FIG. 5, in some embodiments where a non-3GPP access is supported by UE device 108, the non-3GPP access may be shared between first wireless communication network 104 and second wireless communication network 506. For example, non-native interface 118 and non-native interface 126 may be collectively embodied by a single shared N3IWF interface that may select a UPF/AMF of first wireless communication network 104 to be used for first wireless communication network 104, and the single shared N3IWF interface may select a second UPF/AMF of second wireless communication network 506 to be used for second wireless communication network 506.

UE Device Reporting

The following are examples of how UE device 108 may report to controller 102 or a controller (e.g., network function 524) of second wireless communication network 506. However, UE device 108 is not limiting to reporting information according to the following examples. Additionally, UE device 108 need not report information to either controller 102 or second wireless communication network 506, such as in embodiments where controller 102 or second wireless communication network 506 receive information on PDU sessions from a source other than UE device 108.

UE device 108 may periodically and/or aperiodically report one or more of the following items of information to controller 102 and/or a supervisory controller (e.g., network function 524) of second wireless communication network 506):

(A) A list of PDU sessions connected to first wireless communication network 104 and/or second wireless communication network 106/506. Additionally, UE device 108 may provide one or more following items of information for each PDU session of the list: single-network slice assistance information (S-NSSAI) for the PDU session, domain network name (DNN) address for the PDU session, and PDU session ID for the PDU session.

(B) The following information for each PDU session, or for a group of PDU session, such as when a PDU session is established, or upon request by controller 102 and/or second wireless communication network 506:

(1) Information on a wireless base station (e.g., a cell ID, a global cell ID, and/or a base station ID) associated with a PDU session or a group of PDU sessions.

(2) Information on an access network (e.g., first wireless communication network 104 or second wireless communication 106/506) supporting a PDU session or a group of PDU sessions.

(3) Whether a PDU session or a group of PDU sessions are multi-access PDU(s) or a single-access PDU. In the of case multi-access PDU(s), address(es) of N3IWF(s) and/or TNGF(s) (or PLMN of the N3IWF(s) and/or the TNGF(s)) may also be provided.

(4) An indication of whether a PDU session or a group of PDU sessions are individual/normal PDU session(s) or emergency PDU session(s). In some embodiments, however, UE device 108 may not indicate that a PDU session is an emergency PDU session, and emergency PDU sessions may therefore not be supported.

(5) An address of a SMF serving a PDU session or a group of PDU sessions.

(6) An address of a UPF serving a PDU session or a group of PDU sessions.

(7) An address of a unified data management (UDM) serving a PDU session or a group of PDU sessions.

(8) An address of a data network (e.g., first wireless communication network 104 or second wireless communication network 106/506) serving a PDU session or a group of PDU sessions.

(C) The following information for each PDU session, or for a group of PDU session, such as in response to one or more conditions being met. Examples of such conditions include, but are not limited to, a (i) a measurement result (e.g., RSRP or RSRQ, busy ratio, CSI, rank, and/or the like) of a current base station, a serving cell, or a primary cell of UE device 108 falling below a threshold value or a plurality of threshold values, (ii) a location of UE device 108 (e.g., geographical location, indoor vs outdoor, altitude, and/or the like) satisfying one or more values/conditions, (iii) a speed of UE device 108 (e.g., velocity, direction, and/or the like) satisfying one or more values/conditions, and/or (iv) quality of experience (e.g., packet drop rate, bit error rate, latency, reliability, and/or the like) falling below a threshold value, or a plurality of threshold values.

(1) Measurement results (e.g., RSRP or RSRQ, busy ratio, CSI, rank, and/or the like) and/or an indication that a condition for measurement report triggering has been satisfied.

(2) Location information of UE device 108 and/or an indication that a condition for location information reporting triggering has been satisfied.

(3) Speed information of UE device 108 and/or an indication that a condition for speed information reporting triggering has been satisfied.

(4) Quality of experience metrics and/or an indication that a condition for QoE(s) reporting triggering has been satisfied.

Each of communication environment 100 and communication environment 500 may be include one or more reporting configurations specifying reporting by UE device 108 and/or other elements of the communication environment. Examples of possible reporting configurations include, but are not limited to, (a) one or more reporting metrics (e.g., speed, location, qualities such as latency, reliability and/or bit error rate, serving cell quality, and/or the like), and (b) one or more conditions/thresholds for triggering reporting.

Combinations of Features

Features described above may be combined in various ways without departing from the scope hereof. The following examples illustrate some possible combinations.

(A1) A method includes (1) sending, by a UE device, a first PDU session establishment request to a first SMF of a first communication network, the first PDU session establishment request including a first PDU session identifier; (2) receiving, via the first communication network, a first response indicating successful establishment of the first PDU session; (3) in response to receiving the first response, sending information on the first PDU session to a network function of a second communication network, the UE device being registered with the second communication network and the information on the first PDU session including the first PDU session identifier; (4) receiving a command, from the second communication network, requesting to switch the first PDU session from the first communication network to the second communication network; (5) sending, by the UE device, a second PDU session establishment request to a second SMF of the second communication network, wherein the second PDU session establishment requests includes a second PDU session identifier determined based on the first PDU session identifier; and (6) in response to the UE device establishing the second PDU session with the second communication network, sending a request to disconnect the first PDU session from the first communication network.

(A2) In the method denoted as (A1), each of the first communication network and the second communication network may be a 3GPP wireless communication network.

(A3) In the method denoted as (A2) each of the first communication network and the second communication network may be one of a LTE wireless communication network, a 5G wireless communication network, and a 6G wireless communication network.

(A4) In any one of the methods denoted as (A1) through (A3), the second PDU session identifier may be the same as the first PDU session identifier.

(A5) In any one of the methods denoted as (A1) through (A4), the information on the first PDU session may further include one or more of a base station identifier of the first PDU session, a location of the UE device, a speed of the UE device, and a link quality of the base station.

(A6) In any one of the methods denoted as (A1) through (A5), the UE device may be registered with the first communication network via a first SIM.

(A7) In any one of the methods denoted as (A1) through (A6), the UE device may be registered with the second network via a second SIM.

(A8) In any one of the methods denoted as (A1) through (A7), the first communication network may be based on a 5G core network or an EPC.

(A9) In any one of the methods denoted as (A1) through (A8), the second communication network may be based on a 5G core network or an EPC.

(A10) In any one of the methods denoted as (A1) through (A9), the network function may include one of an ARC or a SSC server, (A11) In any one of the methods denoted as (A1) through (A10), the command may include the first PDU session identifier.

(B1) A method includes (1) receiving, at a network function of a second communication network, information from a UE device on a first PDU session, the UE device being registered with the second communication network, and the information including a first PDU session identifier.

(B2) In the method denoted as (B1), the network function of the second network may be one of an ARC and a SSC server.

(B3) In the method denoted as (B1), the first PDU session may be supported by a first communication network.

(C1) A method for maintaining data session continuity includes (1) receiving, at a controller, information on a first data session for a user equipment (UE) device, the first data session being supported by a first communication network, and the UE device being authenticated with each of the first communication network and a second communication network, (2) determining, at the controller, that the first data session should be switched from the first communication network to the second communication network, and (3) in response to determining that the first data session should be switched from the first communication network to the second communication network, sending a request to the UE device to switch the first data session to the second communication network.

(C2) In the method denoted as (C1), the controller may be separate from each of the first communication network and the second communication network.

(C3) In either one of the methods denoted as (C1) and (C2), the UE device may be independently authenticated with each of the first communication network and the second communication network.

(C4) In any one of the methods denoted as (C1) through (C3), the UE device may be authenticated with the first communication network using a first subscriber identity module (SIM) of the UE device, and the UE device may be authenticated with the second communication network using a second SIM of the UE device.

(C5) In any one of the methods denoted as (C1) through (C4), the first data session may be a protocol data unit (PDU) session.

(C6) Any one of the methods denoted as (C1) through (C5) may further include receiving, at the controller from the UE device, information on the first data session.

(C7) The method denoted as (C6) may further include determining that the first data session should be switched from the first communication network to the second communication network at least partially based on the information on the first data session.

(C8) In any one of the methods denoted as (C1) through (C7), each of the first communication network and the second communication network may be a Third Generation Partnership Project (3GPP) wireless communication network.

(D1) A method for maintaining data session continuity operable with a user equipment (UE) device includes (1) authenticating the UE device with each of a first communication network and a second communication network, (2) establishing a first data session with the first communication network, (3) sending information on the first data session to one of (a) a controller that is separate from each of the first communication network and the second communication network and (b) a network function of the second communication network, (4) receiving, from one of the controller and the network function, a request to switch the first data session from the first communication network to the second communication network, and (5) in response to receiving the request, establishing a second data session with the second communication network.

(D2) In the method denoted as (D1), each of the first data session and the second data session may be a respective protocol data unit (PDU) session.

(D3) In either one of the methods denoted as (D1) and (D2), authenticating the UE device with each of the first communication network and the second communication network may include independently authenticating the UE device with each of the first communication network and the second communication network.

(D4) In any one of the methods denoted as (D1) through (D3), authenticating the UE device with each of the first communication network and the second communication network may include (1) authenticating the UE device with the first communication network using a first subscriber identity module (SIM) of the UE device and (2) authenticating the UE device with the second communication network using a second SIM of the UE device.

(D5) In any one of the methods denoted as (D1) through (D4), each of the first data session and the second data session may include a common session identifier.

(D6) In any one of the methods denoted as (D1) through (D5), the information on the first data session may include one or more of (a) wireless base station identifier identifying a wireless base station supporting the first data session, (b) a location of the UE device, (c) a speed of the UE device, and (d) a link quality of a communication link supporting the first data session.

(D7) In any one of the methods denoted as (D1) through (D6), each of the first communication network and the second communication network may be a Third Generation Partnership Project (3GPP) wireless communication network.

(E1) A method for maintaining data session continuity includes (1) receiving, at a network function of a second communication network, information on a first data session for a user equipment (UE) device, the first data session being supported by a first communication network, and the UE device being authenticated with each of the first communication network and the second communication network, (2) determining, at the network function, that the first data session should be switched from the first communication network to the second communication network, and (3) in response to determining that the first data session should be switched from the first communication network to the second communication network, sending a request to the UE device to switch the first data session to the second communication network.

(E2) In the method denoted as (E1), the UE device may be authenticated with the first communication network using a first subscriber identity module (SIM) of the UE device, and the UE device may be authenticated with the second communication network using a second SIM of the UE device.

(E3) Either one of the methods denoted as (E1) and (E2) may further include (1) receiving, at the network function from the UE device, information on the first data session, and (2) determining that the first data session should be switched from the first communication network to the second communication network at least partially based on the information on the first data session.

(E4) In any one of the methods denoted as (E1) through (E3), each of the first communication network and the second communication network may be a Third Generation Partnership Project (3GPP) wireless communication network.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for maintaining data session continuity, the method comprising:
    receiving, at a controller, information on a first data session for a user equipment (UE) device, the first data session being supported by a first Third Generation Partnership Project (3GPP) wireless communication network, and the UE device being authenticated with each of the first 3GPP wireless communication network and a second 3GPP wireless communication network;
    determining, at the controller, that the first data session should be switched from the first 3GPP wireless communication network to the second 3GPP wireless communication network; and
    in response to determining that the first data session should be switched from the first 3GPP wireless communication network to the second 3GPP wireless communication network, causing the first data session to be switched from the first 3GPP wireless communication network to the second 3GPP wireless communication network without coordination between the first 3GPP wireless communication network and the second 3GPP wireless communication network during handover of the first data session from the first 3GPP wireless communication network to the second 3GPP wireless communication network at least partially by sending a request to the UE device to switch the first data session to the second 3GPP wireless communication network.

2. The method of claim 1, wherein the controller is separate from each of the first 3GPP wireless communication network and the second 3GPP wireless communication network.

3. The method of claim 1, wherein the UE device is independently authenticated with each of the first 3GPP wireless communication network and the second 3GPP wireless communication network.

4. The method of claim 1, wherein:
    the UE device is authenticated with the first 3GPP wireless communication network using a first subscriber identity module (SIM) of the UE device; and
    the UE device is authenticated with the second 3GPP wireless communication network using a second SIM of the UE device.

5. The method of claim 1, wherein the first data session is a protocol data unit (PDU) session.

6. The method of claim 1, further comprising receiving, at the controller from the UE device, information on the first data session.

7. The method of claim 6, further comprising determining that the first data session should be switched from the first 3GPP wireless communication network to the second 3GPP wireless communication network at least partially based on the information on the first data session.

8. A method for maintaining data session continuity operable with a user equipment (UE) device, the method comprising:
    authenticating the UE device with each of a first Third Generation Partnership Project (3GPP) wireless communication network and a second 3GPP wireless communication network;
    establishing a first data session with the first 3GPP wireless communication network;
    sending information on the first data session to one of (a) a controller that is separate from each of the first 3GPP wireless communication network and the second 3GPP wireless communication network and (b) a network function of the second communication network;
    receiving, from one of the controller and the network function, a request to switch the first data session from the first 3GPP wireless communication network to the second 3GPP wireless communication network; and
    in response to receiving the request, establishing a second data session with the second 3GPP wireless communication network such that the UE device is handed over from the first 3GPP wireless communication network to the second 3GPP wireless communication network without coordination between the first 3GPP wireless communication network and the second 3GPP wireless communication network.

9. The method of claim 8, wherein each of the first data session and the second data session is a respective protocol data unit (PDU) session.

10. The method of claim 8, wherein authenticating the UE device with each of the first 3GPP wireless communication network and the second 3GPP wireless communication network comprises independently authenticating the UE device with each of the first 3GPP wireless communication network and the second 3GPP wireless communication network.

11. The method of claim 8, wherein authenticating the UE device with each of the first 3GPP wireless communication network and the second 3GPP wireless communication network comprises:

authenticating the UE device with the first 3GPP wireless communication network using a first subscriber identity module (SIM) of the UE device; and authenticating the UE device with the second 3GPP wireless communication network using a second SIM of the UE device.

12. The method of claim 8, wherein each of the first data session and the second data session have a common session identifier.

13. The method of claim 8, wherein the information on the first data session includes one or more of (a) a wireless base station identifier identifying a wireless base station supporting the first data session, (b) a location of the UE device, (c) a speed of the UE device, and (d) a link quality of a communication link supporting the first data session.

14. The method of claim 8, wherein the request includes an identifier of the first data session.

15. A method for maintaining data session continuity, the method comprising:

receiving, at a network function of a second third Generation Partnership Project (3GPP) wireless communication network, information on a first data session for a user equipment (UE) device, the first data session being supported by a first 3GPP wireless communication network, and the UE device being authenticated with each of the first 3GPP wireless communication network and the second 3GPP wireless communication network;

determining, at the network function, that the first data session should be switched from the first 3GPP wireless communication network to the second 3GPP wireless communication network; and in response to determining that the first data session should be switched from the first 3GPP wireless communication network to the second 3GPP wireless communication network, causing the first data session to be switched from the first 3GPP wireless communication network to the second 3GPP wireless communication network without coordination between the first 3GPP wireless communication network and the second 3GPP wireless communication network during handover of the first data session from the first 3GPP wireless communication network to the second 3GPP wireless communication network at least partially by sending a request to the UE device to switch the first data session to the second 3GPP wireless communication network.

16. The method of claim 15, wherein:

the UE device is authenticated with the first 3GPP wireless communication network using a first subscriber identity module (SIM) of the UE device; and the UE device is authenticated with the second 3GPP wireless communication network using a second SIM of the UE device.

17. The method of claim 15, further comprising:

receiving, at the network function from the UE device, information on the first data session; and determining that the first data session should be switched from the first 3GPP wireless communication network to the second 3GPP wireless communication network at least partially based on the information on the first data session.

* * * * *